(12) United States Patent
Armangau et al.

(10) Patent No.: US 9,864,753 B1
(45) Date of Patent: Jan. 9, 2018

(54) DATA STORAGE SYSTEM WITH ADAPTIVE FILE SYSTEM OVER-PROVISIONING

(71) Applicant: EMC Corporation, Hopkinton, MA (US)

(72) Inventors: Philippe Armangau, Acton, MA (US); Ahsan Rashid, Edison, NJ (US); Kumari Bijayalaxmi Nanda, Edison, NJ (US); Alexander Mathews, Morganville, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 80 days.

(21) Appl. No.: 15/085,276

(22) Filed: Mar. 30, 2016

(51) Int. Cl.
*G06F 12/00* (2006.01)
*G06F 17/30* (2006.01)
*G06F 3/06* (2006.01)

(52) U.S. Cl.
CPC ...... *G06F 17/30138* (2013.01); *G06F 3/0608* (2013.01); *G06F 3/0652* (2013.01); *G06F 3/0653* (2013.01); *G06F 3/0689* (2013.01)

(58) Field of Classification Search
CPC ....... G06F 3/0604; G06F 3/0631; G06F 11/34
See application file for complete search history.

(56) References Cited

U.S. PATENT DOCUMENTS

2014/0372723 A1\* 12/2014 Bobroff ................ G06F 12/023
711/170

\* cited by examiner

*Primary Examiner* — David X Yi
*Assistant Examiner* — Arvind Talukdar
(74) *Attorney, Agent, or Firm* — BainwoodHuang

(57) ABSTRACT

A data storage system tracks liability and insurance for an internal file system, liability being a number of slices needed to store file system data, insurance being a number of slices allowed to be consumed. A reserve of un-provisioned insurance is maintained from which slices are provisioned to the file system for use in storing file system data without immediate requirement for increasing the insurance. Slices are provisioned to the file system from the reserve of un-provisioned insurance based on a window criteria and a space criteria, the window criteria being that a number of free windows is less than a free window threshold, the space criteria being that a number of currently provisioned slices is less than a maximum allowed slices, which includes an overprovisioning factor applied to the primary file size to allow for growth of the primary file without immediate requirement for increasing provisioned insurance.

20 Claims, 5 Drawing Sheets

DATA STORAGE SYSTEM WITH ADAPTIVE FILE SYSTEM OVER-PROVISIONING

BACKGROUND

The present invention is related to the field of data storage systems, and in particular data storage systems employing internal file systems for managing the storage of client data.

One important aspect of file system operation is space reservation and provisioning. In one known scheme, space becomes reserved to a file system when the current reserved space minus the file system requirement drops below some predetermined threshold. When this occurs, the file system issues a reservation request to a lower-level manager of underlying physical storage resources, which reserves the requested space to the file system if there is free space in a storage pool, and otherwise denies the request. Space is provisioned to the file system from the reserved space when the current free space in the file system drops below some predetermined threshold, and the file system has un-provisioned reserved space from which to draw. In this case, the file system requests units of storage from the underlying pool manager, which adds the requested units to the file system from the un-provisioned reserved space.

Provisioned space is reclaimed from the file system in a known technique by periodically checking whether the file system free space has risen above some predetermined threshold, and if so then returning some number of provisioned units to the pool to reduce the free space back below the threshold. Reserved space is reclaimed in a known technique by monitoring for the difference between file system reserved space and file system requirement to go above some predetermined threshold, and returning excess reserved space to the pool. In this case the checking may be done on a regular periodic basis, such as by use of timer, for example.

SUMMARY

The above known techniques for space reservation and provisioning, as well as space reclamation, exhibit a particular drawback with respect to the desire for continuous free space to maximize effectiveness of so-called "stripe writes", i.e., writes of large sets of contiguous data across a RAID set of physical storage devices. The known reservation and provisioning techniques are based on aggregate number of free blocks, without regard to whether the blocks are in consecutive groups or are more scattered in the file system. Viewed another way, the known techniques do not account for fragmented space. If a file system has a lot of free space then new units will not be added to it, even if the space is fragmented and there is little opportunity for efficient stripe writes to be used.

In contrast to the above known techniques, the disclosed techniques take more account of the pattern of block usage by the file system, and accordingly increase the usage of consecutive blocks and improve performance of stripe writes. Overall, the disclosed techniques work to maintain a minimum number of consecutive free blocks, which is referred to herein as a "window". The space consumed by a file system is dynamically limited to be a function of both pool utilization and the size of a logical storage unit (LUN) or other storage object stored in the file system. There are also features for reducing undesirable oscillation or "ping-pong" between space provisioning and space reclaim.

More particularly, a method is disclosed of operating a data storage system to manage use of pool storage by a file system of the data storage system, the pool storage provided by physical data storage devices and organized into slices each containing a predetermined number of contiguous blocks. The blocks of each slice are further organized into windows of multiple contiguous blocks, and the file system stores a primary file for a primary storage object and secondary files for secondary storage objects derived from the primary storage object.

The method includes continually tracking liability and insurance of the file system, the liability being a number of slices needed by the file system to store file system data, the insurance being a number of slices allowed to be consumed by the file system. The insurance includes provisioned insurance and un-provisioned insurance, the provisioned insurance being a number of slices currently used by the file system, the un-provisioned insurance being a remainder portion not currently used by the file system.

A reserve of un-provisioned insurance is maintained from which slices are provisioned to the file system for use in storing file system data without immediate requirement for increasing the insurance, by increasing the insurance when a current value of the un-provisioned insurance drops below a predetermined non-zero low-insurance threshold.

Slices are provisioned to the file system from the reserve of un-provisioned insurance, thereby increasing the provisioned insurance, based on both a window criteria and a space criteria. The window criteria is that a number of free windows is less than a predetermined non-zero free window threshold, a free window being a window whose blocks do not currently store file system data. The space criteria is that a number of currently provisioned slices is less than a maximum allowed slices, the maximum allowed slices including an overprovisioning factor applied to the primary file size to allow for growth of the primary file without immediate requirement for increasing the provisioned insurance.

The disclosed technique promotes greater availability of contiguous blocks of storage, increasing efficiency of stripe writes. It also exhibits greater efficiency in managing the use of storage resources by the file system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
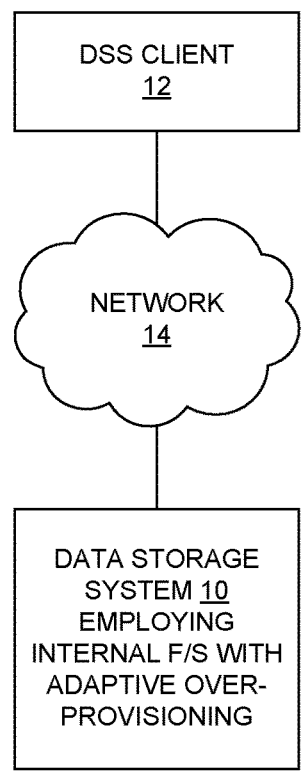
FIG. 1 is a block diagram of a computer system.

FIG. 1 shows a computer system having a data storage system 10 coupled to one or more data storage system (DSS) clients 12 by a network 14. In a typical case a DSS client 12 is a host computer such as a server computer executing one or more application programs (applications) for which the secondary storage (block or file) is maintained by the data storage system 10, with the network 12 conveying data storage requests and responses, as well as associated data. For example, a DSS client 12 performs a write operation to a block-oriented storage device by issuing a write request that specifies the device, the starting logical address, and the length, as well as the associated write data. The network 12 conveys the write request and write data to the data storage system 10, which stores the write data on the identified device beginning at the specified logical address. A DSS client 12 performs a read operation to a block-oriented device by issuing a read request that specifies the device, the starting logical address, and the length. The network 12 conveys the read request to the data storage system 10, which obtains the data from the specified device beginning at the specified logical address and returns the data to the DSS client 12 via the network 14. As explained more below. the data storage system 10 may present storage resources to the DSS clients 12 in alternative ways, such as in the form of a network-level or distributed file system, or as virtual volumes or similar virtualized storage containers that are understood by DSS clients 12 hosting virtual machines, such as ESX® hosts (servers) or XEN® hosts (servers).

As indicated at 10, the data storage system 10 employs one or more internal file systems for managing the use of storage resources, along with a technique of allocating underlying physical storage to the file systems referred to as "adaptive over-provisioning". This technique provides certain advantages in operation as is explained more below.

Figure 2:
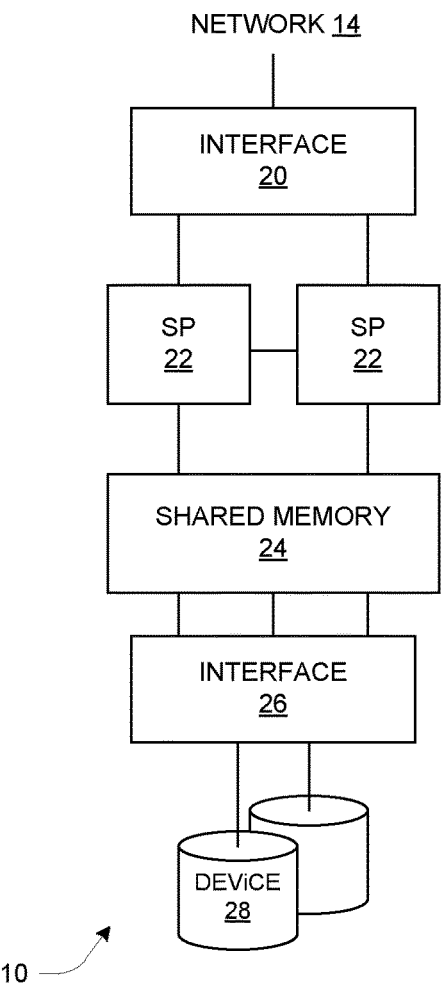
FIG. 2 is a hardware-oriented block diagram of a data storage system.

FIG. 2 is a block diagram of the data storage system 10 from a hardware perspective. It includes an interface 20 to the network 14, a pair of storage processors (SPs) 22, shared memory 24, and an interface 26 to secondary storage devices (DEVICE) 28, such as magnetic disks, Flash drives, etc. The interface 20 may include one or more network adapters such as a FibreChannel adapter, Gigabit Ethernet adapter, etc., and the interface 26 may similarly include storage-oriented adapters such as FibreChannel adapters etc. Each storage processor 22 executes software causing the storage processor 22 to present logical or virtualized storage resources to the network 14 and DSS clients 12, employing the devices 28 for the underlying physical storage. The logical or virtualized storage resources may include either or both block-oriented devices (e.g., logical storage units (LUNs), virtual volumes (VVOLS), etc.) and/or client-visible file systems (e.g., NFS, CIFS, etc.) The shared memory 24 may be used for one or more device caches, also referred to as a "storage cache", for caching data of the devices 28. Further details of the structure and operation of the data storage system 10 are provided below.

Figure 3:
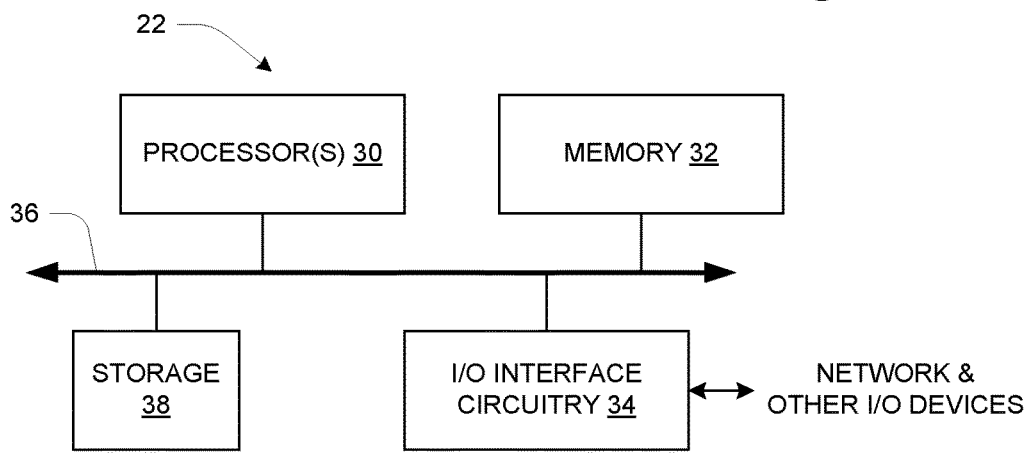
FIG. 3 is a hardware-oriented block diagram of a storage processor.

FIG. 3 shows an example configuration of a storage processor 22 from a computer hardware perspective. The hardware includes one or more processors 30, memory 32, and interface circuitry 34 interconnected together by data interconnections 36 such as one or more high-speed data buses. The interface circuitry 34 provides a hardware connections to the shared memory 24 and interfaces 20, 26 (FIG. 2) and perhaps other external devices/connections (EXT DEVs). The processor(s) 30 with connected memory 32 may also be referred to as "processing circuitry" herein. A storage processor 22 may also have its own local secondary storage 38 such as a Flash memory array. In operation, the memory 32 stores data and instructions of system software (e.g., operating system) and one or more application programs which are executed by the processor(s) 30 to cause the hardware to function in a software-defined manner. Thus the computer hardware executing instructions of a data storage application, such as described below, can be referred to as a data storage circuit or data storage component, and it will be understood that a collection of such circuits or components can all be realized and interact with each other as one or more sets of computer processing hardware executing different computer programs as generally known in the art.

Figure 4:
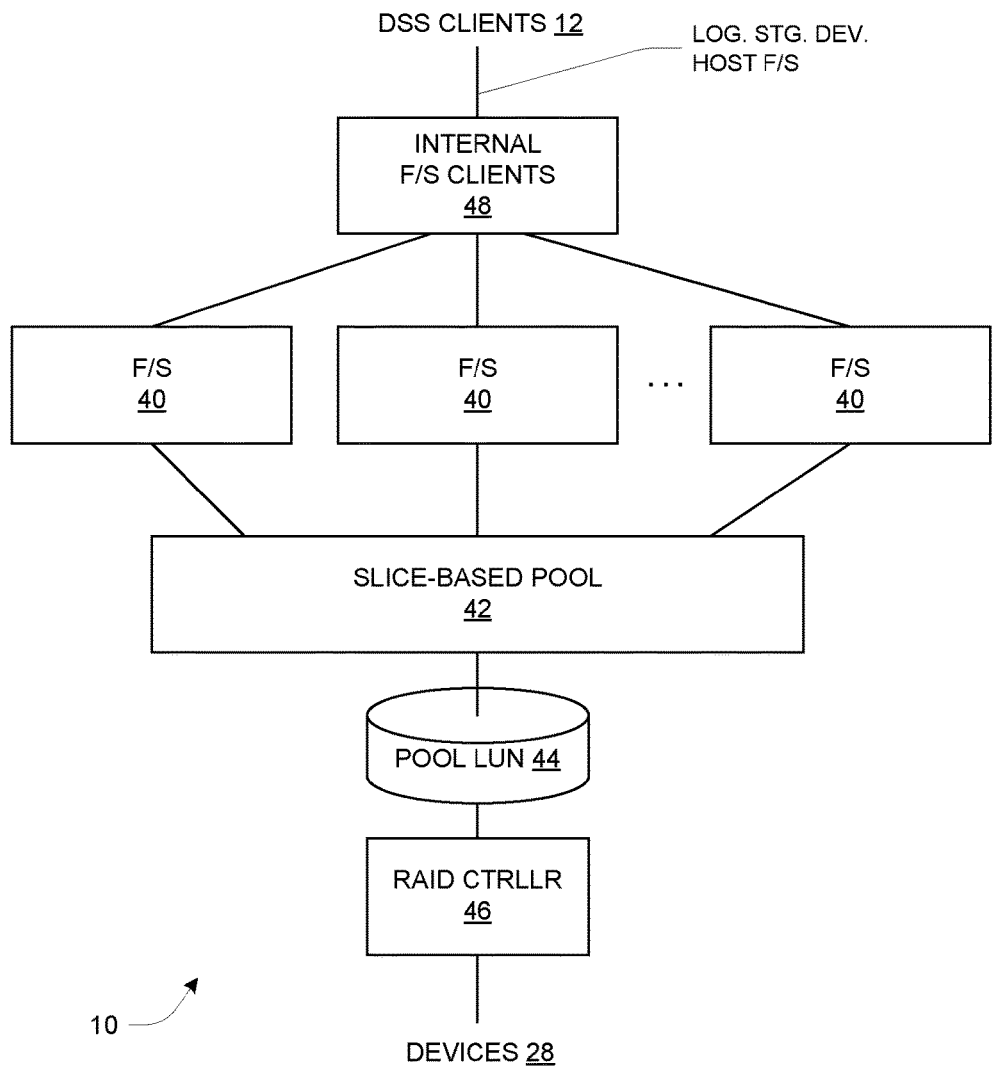
FIG. 4 is a functional block diagram of a data storage system.

FIG. 4 is a functional block diagram of the data storage system 10, the functional blocks generally being realized by execution of computer program instructions by the storage processor hardware as shown in FIG. 3. This description focuses on certain aspects of the functional structure and operation, specifically the use of one or more internal file systems (F/S) 40 which draw their underlying physical storage from the devices 28 via a certain organization as shown. This organization includes a pool 42 of data units called "slices" that are carved from an internal logical storage unit called a "pool LUN" 44, which in turn is presented by a RAID controller 46 implementing RAID over sets of the devices 28. Thus in general there may be a one-to-multiple mapping between the pool LUN 44 and corresponding devices 28 providing the RAID-protected underlying physical storage.

The internal file systems 40 are utilized by one or more internal file system clients 48 that present storage resources to the DSS clients 12. Examples of such presented resources include a logical storage device and a host file system as shown. In one embodiment, a logical storage device is mapped to a file of a file system 40. The data storage system 10 may support point-in-time copying of device data, with the copies being referred to as "snapshots" or "snaps". In this case, the device being copied may be referred to as the "primary" object and its snaps as "secondary" objects, and a given file system 40 hosts both the primary object as well as all its snaps, all stored in respective distinct files of the given file system 40.

Figure 5:
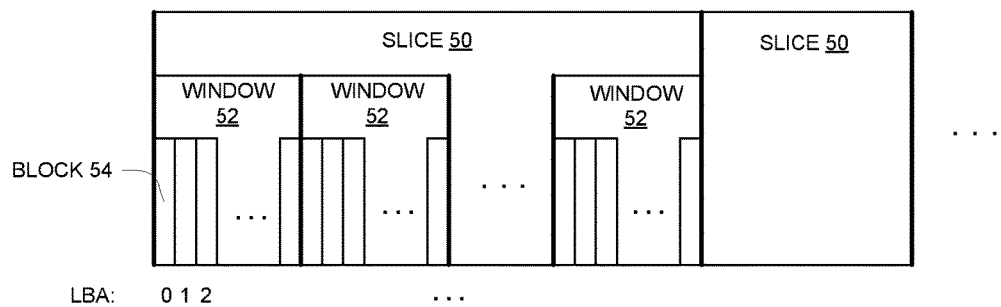
FIG. 5 is a schematic depiction of block, window and slice data units.

FIG. 5 illustrates certain data units defined and used within the data storage system 10, namely slices 50, windows 52 and blocks 54. A block 54 is the basic addressable storage unit, and a storage device 28 can be viewed as a linear array of blocks 54 having respective logical block addresses (LBAs). In an example embodiment herein, the size of a block is 4 KB, and blocks 54 all start at naturally aligned offsets (i.e., at LBAs corresponding to integer multiples of 4 KB). A logical storage device is referred to as "block-oriented" because it is accessed by specifying a range of consecutive LBAs involved in an operation such as a read or write. Typically the range is specified with a starting LBA and a length value indicating the number of blocks in the range. A file system 40 is "file-oriented", where a file is a linear array of bytes. A file system 40 relies on a logical volume or device for underlying physical storage, and thus is involved with block operations on such devices.

Sets of consecutive blocks 54 are allocated as slices 50 out of the slice pool 42. A slice 50 is preferably several orders of magnitude larger than a block 54. In one example herein, a slice 50 has size 256 MB. Within each slice 50, intermediate structures called windows 52 are defined. Generally, windows 52 are used to manage allocation in a way that prevents undue fragmentation of the storage for a file system 40, and thereby increases efficiency of storage operations. In particular, by employing windows 52 the data storage system 10 makes much more efficient use of stripe write operations performed by the RAID controller 46 than would be obtained in the absence of window structuring. Processes of allocation and reclaiming of blocks can result in fragmentation that would tend to reduce the physical-LBA sequentiality of blocks, reducing the ability to fully utilize stripe writes and thus reducing efficiency of operation of the RAID controller 46 and devices 48. In the examples herein, the window size is 512 KB or 128 blocks.

As indicated above, one general goal of the presently disclosed techniques is to maintain ample consecutive free space (i.e., un-fragmented free space) in a file-system 40. This goal is to be balanced against another goal, which is to limit total free space in a file system 40 so that other file systems 40 in the same pool 42 (see FIG. 4) are not starved for storage space.

Terminology

Certain useful terms used herein may be understood as follows:
Slices
  Fixed-size units into which the pool free space is divided
  Slices are added to file systems as writes occur (client data written to F/S)
  Slices are removed from file systems as space is freed (e.g., client data deleted)
Liability
  Number of slices needed by a file system
Insurance
  Number of slices a file system is allowed to consume from a pool
Provisioned Insurance
  Number of slices added to a file system for its exclusive use
Un-provisioned Insurance
  Number of slices of insurance not yet added to a file system It is useful to consider current techniques for space reservation and provisioning, as a point of departure for the remaining description herein. In one known scheme, space becomes reserved to a file system (i.e., is added to insurance) when the current insurance minus the file system liability drops below some predetermined threshold, such as 1 GB for example. When this occurs, the file system issues an insurance request to the lower-level pool manager, which adds the requested insurance to the file system if there is free space in the pool, and otherwise denies the request. Space is provisioned to the file system from the insurance when the current free space in the file system drops below some predetermined threshold, such as 850 MB for example, and the file system has un-provisioned insurance from which to draw. In this case, the file system requests one or more slices from the underlying pool manager, which adds the requested slice(s) from the un-provisioned insurance.

Additionally, provisioned space is reclaimed from the file system in a known technique by periodically checking whether the file system free space has risen above some predetermined threshold, and if so then returning some number of provisioned slices to the pool to reduce the free space back below the threshold. The checking can be done after certain operations including create, delete, punch-hole, truncate, and de-duplication operations. Insurance is reclaimed in a known technique by monitoring for the difference between file system insurance and file system liability to go above some predetermined threshold, and returning excess insurance to the pool. In this case the checking may be done on a regular periodic basis, such as by use of timer, for example.

The above known techniques for space reservation and provisioning, as well as space reclamation, exhibit a particular drawback with respect to the desire for continuous free space to maximize effectiveness of stripe writes. The known techniques are based on aggregate number of free blocks, without regard to whether the blocks are in consecutive groups or are more scattered in the file system. Viewed another way, the known techniques do not account for fragmented space. If a file system has a lot of free space then new slices will not be added to it, even if the space is fragmented and thus there is little opportunity for efficient stripe writes to be used.

In contrast to the above known techniques, the disclosed techniques take more account of the pattern of block usage by the file system, and accordingly increase the usage of consecutive blocks and improve performance of stripe writes. Overall, the disclosed techniques work to maintain a minimum number of consecutive free blocks, which is referred to herein as a "window" (e.g., window 52). The space consumed by a file system is dynamically limited to be a function of both pool utilization and the size of the LUN or other storage object stored in the file system. There are also features for reducing undesirable oscillation or "ping-pong" between space provisioning and space reclaim.

Space reservation operates as follows:
  Keep a "low-insurance-threshold" worth of un-provisioned insurance in the file system. Thus when new slices are required, insurance already exists for them and it is not necessary to request insurance immediately at that time. Thus new insurance is requested when the un-provisioned insurance drops below this threshold.
  When insurance is requested that will not be immediately provisioned, allow the pool to deny the request if pool free space is low, i.e., pool utilization is above a threshold (e.g., 90%)

Space provisioning operates as follows:
  Request slices when the number of free windows in the file system falls below a free window threshold. In one example, this threshold might be 2048 windows, which represents 1 GB of space assuming a window size of 512 KB. As a secondary factor, the number of provisioned slices should be below a predetermined maximum number of slices for the file system which is a function of primary file size, space consumed by replicas, and pool free space. In one example the following formula may be used, which includes a factor "over-provisioning %" that represents an allowed amount by which a file system may be overprovisioned (i.e., include provisioned slices beyond its current liability):

$$\text{allowed slices} = \frac{\text{primary file size in slices} \times (100 + \text{overprovisioning}\%)}{100} +$$
$$\text{slices consumed by replicas},$$

where $$\text{overprovisioning}\% = 50\% \times \text{pool\_free }\%$$

The following table provides illustrative examples of usage of the above criteria:

| Pool Free % | Over- Prov % | Primary LUN (GB) | Max File System Data Space (GB) |
|---|---|---|---|
| 100 | 50 | 100 | 150.00 |
| 75 | 37.5 | 100 | 137.50 |
| 50 | 25 | 100 | 125.00 |

| Pool Free % | Over-Prov % | Primary LUN (GB) | Max File System Data Space (GB) |
|---|---|---|---|
| 50 | 25 | 200 | 250.00 |
| 50 | 25 | 300 | 375.00 |

Space reclamation is performed by a file system reclaim (FSR) process that periodically performs the following, which are explained in more detail below:
  Read the following property that is maintained by the file system and identifies the number of slices that are free and thus may be evacuated:
    FS_PROPERTY_EVACUATABLE_DATA_SLICES
  Choose-and-Mark (CAM) (see below)
  Evacuate Slices (move data of selected slices to other slices)
  Remove Slice (return evacuated slices to pool)
The file system 40 employs the following variable for tracking the number of slices that may be evacuated:
  FS_PROPERTY_EVACUATABLE_DATA_SLICES,
and reports a value for this variable such that after removing these many slices, another slice request will not be triggered immediately. For this purpose the following formula may be used (there should be separate checks for underflow and compliance with a bound on total evacuatable free space):
  Max(A−C, B), where:
    A=(free windows−free window threshold)/windows per slice. This is so that after reclaim, there are 'free window threshold' number of free windows.
    B=provisioned slices−max allowed slices. This is to give back overprovisioned slices. Note that 'max allowed slices' is a function of pool space.
    C=a small integer, e.g., 1, representing a "hold back" to avoid ping pong (immediate need for provisioning another slice).

Figure 6:
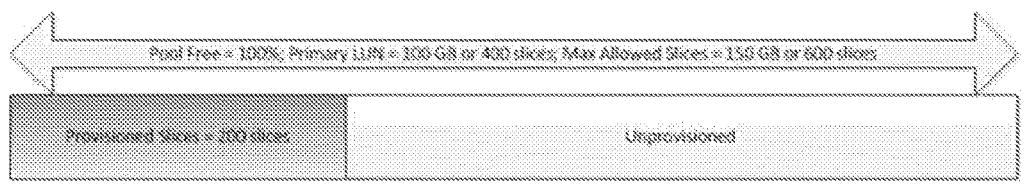
FIGS. 6-9 are schematic depictions of use of pool storage by a file system.

FIG. 6 is used to illustrate a first example of the above. In this case, the pool is 100% free, the primary LUN has a size of 100 GB or 400 slices (256 MB each), and the Max allowed slices is 150 GB or 600 slices. The file system is not over-provisioned.

$$A = \frac{200 \text{ slices} \times 512 \text{ windows per slice} - 2048 \text{ free window threshold}}{512 \text{ windows per slice}} = 196$$

$$B = 200 - 600 = -400$$

$$MAX(A-C, B) = MAX(196-1, -400) = 195$$

Thus in this example the number of evacuatable slices reported is 195.

Figure 7:
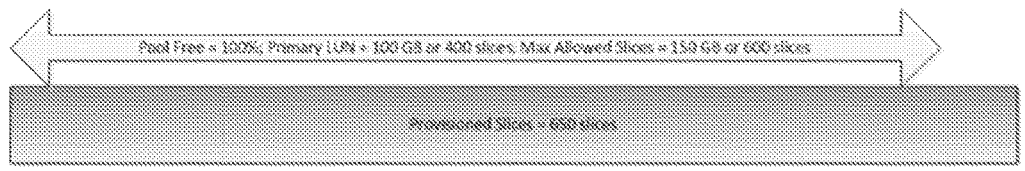

FIG. 7 illustrates a second example. In this case, the file system is over-provisioned and there are no free windows.

$$A = \frac{0 - 2048 \text{ free window threshold}}{512 \text{ windows per slice}} = -4$$

$$B = 650 - 600 = 50$$

$$MAX(A-C, B) = MAX(-5, 50) = 50$$

Thus in this example, the number of evacuatable slices reported is 50.

Space Reclaim—CAM Slice Selection Policy

When space is reclaimed, it is necessary to identify particular slices to be evacuated, a process referred to as "choose and mark" or CAM.

In known techniques, slices may be chosen according to a preference order as follows:
  Empty data slices
  Empty metadata slices
  Most free data slices In the disclosed technique, CAM may instead proceed as follows:
  Re-compute evacuatable data slices per above formula (Max(A−C, B))
    If (A>B), there are excess free windows
      Select slices whose removal will cause the least amount of decrease in the number of free windows (see formula below)
    If (A<B), the file system is beyond the overprovisioning limit
      Select slices using a policy such as above (empty data, empty metadata, most free) to avoid moving blocks around unnecessarily
  In all cases, skip slices with that are currently being used for writes of sequential streams of data
For the case of A>B, slices may be selected by computing a value X and selecting slices with lower/lowest values of X:

$X = Y + Z$, where

Y=Number of free windows in that slice
Z=Number of free windows consumed by moving blocks out of the slice (i.e., blocks allocated in slice/blocks per window)

Figure 8:
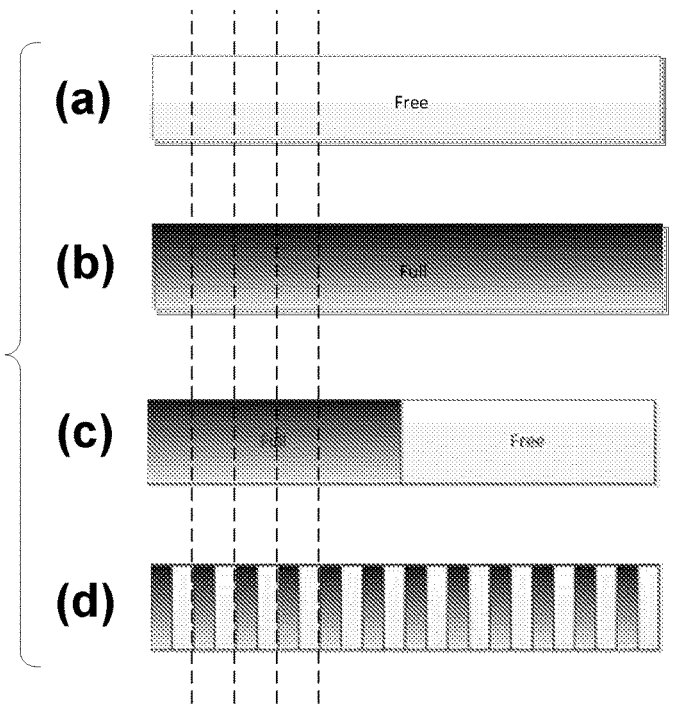

FIG. 8 is used to illustrate four examples. Window boundaries are indicated by dashed vertical lines.
Example (a) is a completely free slice. In this case:

$X = 512 + 0 = 512$

This slice is not a good candidate, as it is not desirable to evacuate completely free windows. The high value of 512 reflects this.

Example (b) is a fully allocated slice. In this case:

$X = 0 + 512 = 512$

This slice is also not a good candidate. It has fully utilized windows with no free space to offer, and it will consume parts of other free windows if its data is moved. The high value of 512 reflects this.

Example (c) is a slice with 50% of its windows fully allocated. In this case:

$X = 256 + 256 = 512$

This slice is also not a good candidate, as reclaiming it will not create any new free windows.

Example (d) is a slice with all windows being 50% allocated. In this case:

$X = 0 + 256$

This slice is a relatively good candidate, because reclaiming it will create free windows. The lower score of 256 reflects this.

As noted above, one way to reduce ping-pong is to hold back one or more empty slices that might otherwise be reclaimed. Another mechanism that can be used is to employ a form of hysteresis, i.e., when a slice is removed, no additional slices are removed for some brief period such as 5 minutes. This time may be fixed or dynamically variable.

Space Maker

Another aspect of managing the use of underlying storage space by a file system is a form of de-fragmentation referred to as "Space Maker". Space Maker rearranges file system blocks to create un-fragmented free space. Space Maker may be run regularly based on certain start conditions, and terminate based on certain stop conditions. It selects candidate slices and candidate windows within the slices, then evacuates selected windows in a manner described below.

The following may be aspects of start triggers for Space Maker:
- File System Reclaim (FSR) is not running
  - Avoid contention with slice evacuation
- File system has more than some minimum number (e.g., 20) of provisioned data slices
  - Avoid running on a new file system that has just started to take I/O
- Free window count drops below a predetermined threshold that is greater than the free window threshold used for provisioning
  - Start running before slice over-provisioning kicks in. In one example, if the provisioning threshold is 2K as mentioned above, then the Space Maker threshold might be 3K for example.
- There are partial windows and they can be evacuated to create free windows such that the final free window count can go above some threshold, e.g., 6K windows $$\left(\frac{\text{number of free blocks}}{\text{number of blocks per window}} > \text{number of free windows}\right)$$

AND $$\left(\frac{\text{number of free blocks}}{\text{number of blocks per window}} > \text{Threshold}\right)$$

The following may be stop triggers for Space Maker, which might be checked upon completion of processing of each slice:
- Free window count goes above the above threshold (e.g., 6K windows)
- There are no partial windows left, or partial windows cannot be evacuated to create free windows such that final free window count can go above the threshold:

$$\left(\frac{\text{number of free blocks}}{\text{number of blocks per window}} \leq \text{number of free windows}\right)$$

OR $$\left(\frac{\text{number of free blocks}}{\text{number of blocks per window}} \leq \text{Threshold}\right)$$

Space Maker may use the following slice selection criteria for selecting slices to evacuate windows:
- The slice is not currently receiving I/O of sequential data writes (to avoid contention with production I/O)
- Net number of free windows that can be created is above a threshold $$\left(\frac{\text{number of free blocks in slice}}{\text{number of blocks per window}} - \text{number of free windows in slice}\right) \geq \text{threshold},$$

where there may be a default value for the threshold (e.g., 32 windows), and its value may range from 1 up to one less than the number of windows in a slice (e.g., 511). Smaller value means more aggressive processing. The threshold may be adjusted dynamically as explained below.

Space Maker may use the following window selection criteria for selecting specific windows to be evacuated:
- Number of free blocks in a window is above a threshold, where there may be a default value for the threshold (e.g., 20 blocks), and its value may range from 1 up to one less than the number of blocks in a window (e.g., 127). Smaller value means more aggressive processing.

Space Maker may dynamically adjust the slice selection threshold and window selection threshold using an approach such as the following (specific values are examples only):
- If number of slices processed is less than 20% of total slices, be more aggressive i.e.,
  - Decrease slice selection threshold by 5
- Else, be less aggressive i.e.,
  - Increase slice selection threshold by 5
- If number of slices processed is less than 20% of total slices
  - If number of windows evacuated is less than 20% of total windows, be more aggressive i.e.,
    - Decrease window selection threshold by 1
  - Else, be less aggressive i.e.,
    - Increase window selection threshold by 1

Another aspect of Space Maker is managing its use of processor resources, specifically its use of execution threads and tasks. The number of Space Maker threads to be used, and file system reclaim (FSR) tasks to be used, are based on:
- LUN overprovisioning
- Historical data ingestion rate The following bounds may be used:
- Max threads 8 (1 thread per slice)
- Max tasks 64 (8 tasks per thread)

The number of tasks permitted at a given time may be as follows:

Max Tasks×(Overprovisioning %+Throttling Factor),
where

Overprovisioning % is the number of slices currently overprovisioned as percent of slices allowed to be overprovisioned, and Throttling Factor is a positive or negative factor based on how busy the system was in a recent analogous period, e.g., at exactly one week back in time.

The following formula may be used for Overprovisioning %:

$$P = \frac{\text{provisioned slices} - \text{lun size in slices}}{\text{max allowed slices} - \text{lun size in slices}}$$

Figure 9:
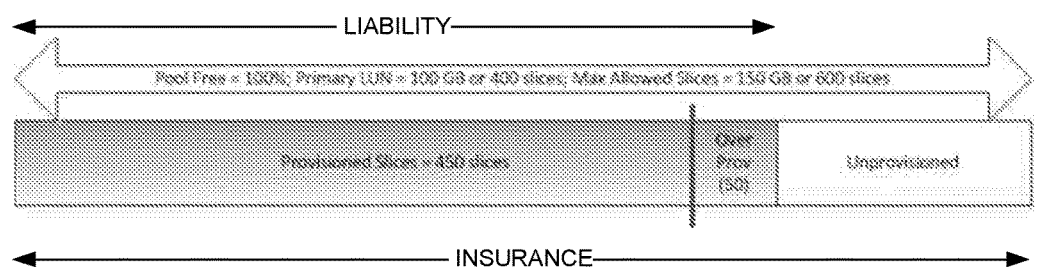

FIG. 9 illustrates the following example, in which the values are the same as for FIGS. 6 and 7 but the file system is overprovisioned by 50 slices:

$$P = \frac{450 - 400}{600 - 400} = 25\%$$

The following approach may be used for calculating the Throttling Factor:
1. Maintain a BusyNessTrackTable[7][24]
   - Tracks hourly ingest of data as percent of day's ingest
   - Tracks this for a full week per storage processor Example:

$$BusyNessTrackTable[0][11] = \frac{\text{Amount ingested on Sunday from 11 am to 12 pm}}{\text{Total amount ingested on Sunday}} \times 100$$

2. Lookup busyness B as BusyNessTrackTable[Current Day][Current Hour]
3. Maintain a BusyNessThrottlingTable[20]
   1 entry per 5% range, could be + or −, and define the throttling factor to apply in each range
4. Lookup throttling factor T as BusyNessThrottlingTable [B÷5]

Figure 10:
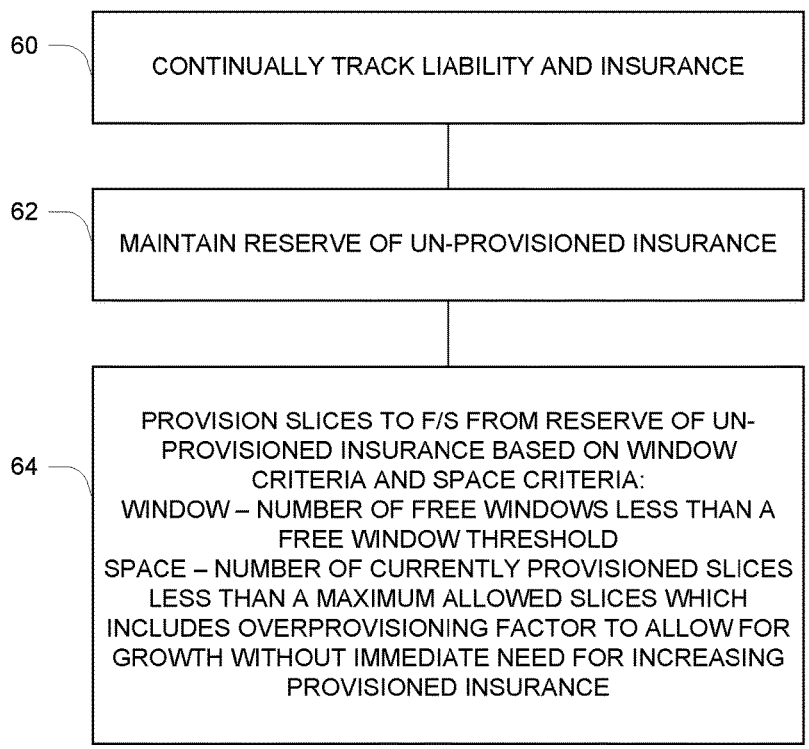
FIG. 10 is a flow diagram for a process of space reservation and provisioning.

Another aspect of managing threads and tasks is their distribution depending on workload. It may be more efficient to process fewer slices at a time but work harder on those slices because they are off limits for block allocation. For example, if 20 tasks are currently allowed, the tasks may be distributed as follows:
   Thread 1-8 tasks
   Thread 2-8 tasks
   Thread 3-4 tasks FIG. 10 outlines provisioning-related operation at a high level.

At 60, liability and insurance of the file system are continually tracked, where the liability is a number of slices needed by the file system to store file system data, and the insurance is a number of slices allowed to be consumed by the file system. The insurance includes provisioned insurance and un-provisioned insurance, the provisioned insurance being a number of slices currently used by the file system, the un-provisioned insurance being a remainder portion not currently used by the file system.

At 62, a reserve of un-provisioned insurance is maintained from which slices are provisioned to the file system for use in storing file system data without immediate requirement for increasing the insurance. The reserve of un-provisioned insurance is maintained by increasing the insurance when a current value of the un-provisioned insurance drops below a predetermined non-zero low-insurance threshold.

At 64, slices are provisioned to the file system from the reserve of un-provisioned insurance, thereby increasing the provisioned insurance, based on both a window criteria and a space criteria. The window criteria is that a number of free windows is less than a predetermined non-zero free window threshold, a free window being a window whose blocks do not currently store file system data. The space criteria is that a number of currently provisioned slices is less than a maximum allowed slices, where the maximum allowed slices includes an overprovisioning factor applied to the primary file size to allow for growth of the primary file without immediate requirement for increasing the provisioned insurance.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a data storage system to manage use of pool storage by a file system of the data storage system, the pool storage provided by physical data storage devices and organized into slices each containing a predetermined number of contiguous blocks, the blocks of each slice further organized into windows of multiple contiguous blocks, the file system storing a primary file for a primary storage object and secondary files for secondary storage objects derived from the primary storage object, comprising:
   continually tracking liability and insurance of the file system, the liability being a number of slices needed by the file system to store file system data, the insurance being a number of slices allowed to be consumed by the file system, the insurance including provisioned insurance and un-provisioned insurance, the provisioned insurance being a number of slices currently used by the file system, the un-provisioned insurance being a remainder portion not currently used by the file system;
   maintaining a reserve of un-provisioned insurance from which slices are provisioned to the file system for use in storing file system data without immediate requirement for increasing the insurance, the reserve of un-provisioned insurance being maintained by increasing the insurance when a current value of the un-provisioned insurance drops below a predetermined non-zero low-insurance threshold; and
   provisioning slices to the file system from the reserve of un-provisioned insurance, thereby increasing the provisioned insurance, based on both a window criteria and a space criteria, the window criteria being that a number of free windows is less than a predetermined non-zero free window threshold, a free window being a window whose blocks do not currently store file system data, the space criteria being that a number of currently provisioned slices is less than a maximum allowed slices, the maximum allowed slices including an overprovisioning factor applied to the primary file size to allow for growth of the primary file without immediate requirement for increasing the provisioned insurance.

2. The method of claim 1, wherein the overprovisioning factor is a predetermined fraction of a current amount of free space in the pool storage, and wherein the maximum allowed slices further includes a factor for space consumed by the secondary storage objects as replicas of the primary storage object.

3. The method of claim 1, wherein the pool storage is shared with one or more other file systems, and wherein increasing the insurance is conditioned on there being at least a predetermined minimum amount of free space in the pool to reduce the likelihood of starvation of the other file systems for storage space.

4. The method of claim 1, further including:
   tracking a number of evacuatable slices as a maximum of first and second values, the first value including a window value reflecting a current number of free windows beyond the free window threshold, the second value including an overprovisioning value reflecting a current amount of overprovisioning of slices to the file system; and
   periodically performing a slice reclaim process to remove the number of evacuatable slices from the file system.

5. The method of claim 4, wherein the first value further includes a hold-back value causing the number to be correspondingly smaller when the first value is greater than the second value, the smaller number resulting in retention of a corresponding number of slices in the file system that would otherwise be evacuatable, the retention avoiding an immediate need for returning slices to the file system upon completion of the slice reclaim process.

6. The method of claim 4, wherein the slice reclaim process includes identifying particular slices to be evacuated using a selected one of two predetermined slice selection criteria, a first slice selection criteria being to select slices whose removal will cause the least amount of decrease in the number of free windows and being used when the first value is greater than the second value, a second slice selection criteria being to select slices in a decreasing-preference order and being used when the second value is greater than the first value, the decreasing-preference order including (1) empty data slices, (2) empty metadata slices, and (3) slices having the most free data.

7. The method of claim 6, wherein selecting slices whose removal will cause the least amount of decrease in the number of free windows includes (1) computing a value X for each of a set of candidate slices, X being the sum of the number of free windows in a candidate slice and the number of free windows consumed by moving blocks out of the slice, and (2) preferentially selecting slices having lower values of X.

8. The method of claim 4, further including, after the slice reclaim process has been performed, preventing removal of any additional slices from the file system for a predetermined timeout period.

9. The method of claim 1, further including:
tracking conditions that establish start and stop triggers for a space maker process used to create un-fragmented free space in the file system;
beginning the space maker process upon satisfaction of conditions of a start trigger, execution of the space maker process including (1) selecting slices with windows to be evacuated, and (2) selecting windows within selected slices for evacuation, and (3) evacuating the selected windows of the selected slices; and
terminating the space maker process upon satisfaction of a stop trigger.

10. The method of claim 9, wherein the start triggers include:
(1) a file system reclaim process is not executing, to avoid contention therewith;
(2) the file system has more than a predetermined number of provisioned data slices, to avoid executing the space maker process if the file system has just started to accept I/O;
(3) the free window count has dropped below a predetermined threshold that is greater than the free window threshold used for provisioning, to begin the space maker process before slices are over-provisioned to the file system; and
(4) there are sufficient partial windows whose evacuation will create sufficient free windows to bring a final free window count above a predetermined desired threshold.

11. The method of claim 9, wherein the stop triggers are checked upon completion of processing of each slice and include:
(1) a free window count goes above the predetermined desired threshold; or
(2) there are insufficient partial windows remaining whose evacuation will create sufficient free windows to being the final free window count above the predetermined desired threshold.

12. The method of claim 9, wherein the space maker process uses a slice selection criteria for selecting slices and a window selection criteria for selecting windows, the slice selection criteria including:
(1) the slice is not currently receiving I/O of sequential data writes, to avoid contention with production I/O; and
(2) a net number of free windows that can be created by evacuating the windows of the slice is above a created-windows threshold,
and the window selection criteria including that a number of free blocks in a window is above a freed-blocks threshold.

13. The method of claim 12, further including dynamically varying the created-windows threshold during operation by:
if the number of slices selected for evacuation of windows is less than a predetermined fraction of total slices, then decreasing the created-windows threshold to increase aggressiveness of the slice selection; and
otherwise increasing the created-windows threshold to decrease the aggressiveness of the slice selection.

14. The method of claim 12, further including dynamically varying the freed-blocks threshold during operation by:
if the number of windows evacuated is less than a predetermined fraction of total windows, then decreasing the freed-blocks threshold to increase the aggressiveness of the window selection; and
otherwise increasing the freed-blocks threshold to decrease the aggressiveness of the window selection.

15. The method of claim 9, further including managing the use of execution threads and tasks of a storage processor for the space maker process based on storage device over-provisioning and historical data ingestion rate.

16. The method of claim 15, wherein managing the use of tasks includes imposing a limit on a number of tasks permitted to be executed concurrently according to both an overprovisioning percentage and a throttling factor, the overprovisioning percentage being a number of slices currently overprovisioned as a percent of slices allowed to be overprovisioned, the throttling factor reflecting how busy the data storage system was in a recent analogous period.

17. The method of claim 16, further including maintaining a busyness tracking table that tracks data ingestion in each of regular periods of a day over multiple days including the recent analogous period, and looking up the throttling factor from an entry for the recent analogous period in the busyness tracking table.

18. The method of claim 16, further including distributing tasks to threads in a manner tending to process fewer slices at a time but permitting more processing to be performed.

19. A data storage system, comprising:
physical storage devices; and
processing circuitry executing computer program instructions to cause the data storage system to operate to manage use of pool storage by a file system of the data storage system, the pool storage provided by the physical data storage devices and organized into slices each containing a predetermined number of contiguous blocks, the blocks of each slice further organized into windows of multiple contiguous blocks, the file system storing a primary file for a primary storage object and secondary files for secondary storage objects derived from the primary storage object, including:
continually tracking liability and insurance of the file system, the liability being a number of slices needed by the file system to store file system data, the insurance being a number of slices allowed to be consumed by the file system, the insurance including provisioned insurance and un-provisioned insurance, the provisioned insurance being a number of slices currently used by the file system, the un-provisioned insurance being a remainder portion not currently used by the file system;
maintaining a reserve of un-provisioned insurance from which slices are provisioned to the file system for use in storing file system data without immediate requirement for increasing the insurance, the reserve of un-provisioned insurance being maintained by increasing the insurance when a current value of the un-provisioned insurance drops below a predetermined non-zero low-insurance threshold; and provisioning slices to the file system from the reserve of un-provisioned insurance, thereby increasing the provisioned insurance, based on both a window criteria and a space criteria, the window criteria being that a number of free windows is less than a predetermined non-zero free window threshold, a free window being a window whose blocks do not currently store file system data, the space criteria being that a number of currently provisioned slices is less than a maximum allowed slices, the maximum allowed slices including an overprovisioning factor applied to the primary file size to allow for growth of the primary file without immediate requirement for increasing the provisioned insurance.

20. A non-transitory computer-readable medium storing computer program instructions executable by processing circuitry of a data storage system to cause the data storage system to operate to manage use of pool storage by a file system of the data storage system, the pool storage provided by physical data storage devices of the data storage system and organized into slices each containing a predetermined number of contiguous blocks, the blocks of each slice further organized into windows of multiple contiguous blocks, the file system storing a primary file for a primary storage object and secondary files for secondary storage objects derived from the primary storage object, including:

continually tracking liability and insurance of the file system, the liability being a number of slices needed by the file system to store file system data, the insurance being a number of slices allowed to be consumed by the file system, the insurance including provisioned insurance and un-provisioned insurance, the provisioned insurance being a number of slices currently used by the file system, the un-provisioned insurance being a remainder portion not currently used by the file system;

maintaining a reserve of un-provisioned insurance from which slices are provisioned to the file system for use in storing file system data without immediate requirement for increasing the insurance, the reserve of un-provisioned insurance being maintained by increasing the insurance when a current value of the un-provisioned insurance drops below a predetermined non-zero low-insurance threshold; and provisioning slices to the file system from the reserve of un-provisioned insurance, thereby increasing the provisioned insurance, based on both a window criteria and a space criteria, the window criteria being that a number of free windows is less than a predetermined non-zero free window threshold, a free window being a window whose blocks do not currently store file system data, the space criteria being that a number of currently provisioned slices is less than a maximum allowed slices, the maximum allowed slices including an overprovisioning factor applied to the primary file size to allow for growth of the primary file without immediate requirement for increasing the provisioned insurance.

\* \* \* \* \*